United States Patent
Han et al.

(10) Patent No.: US 7,957,959 B2
(45) Date of Patent: Jun. 7, 2011

(54) METHOD AND APPARATUS FOR PROCESSING SPEECH DATA WITH CLASSIFICATION MODELS

(75) Inventors: Zhao Bing Han, Beijing (CN); Guo Kang Fu, Beijing (CN); Da Lai Yan, Beijing (CN)

(73) Assignee: Nuance Communications, Inc., Burlington, MA (US)

( * ) Notice: Subject to any disclaimer, the term of this patent is extended or adjusted under 35 U.S.C. 154(b) by 890 days.

(21) Appl. No.: 11/780,607

(22) Filed: Jul. 20, 2007

(65) Prior Publication Data
US 2008/0059156 A1 Mar. 6, 2008

(30) Foreign Application Priority Data
Aug. 30, 2006 (CN) .......................... 2006 1 0115196

(51) Int. Cl.
*G10L 11/04* (2006.01)
(52) U.S. Cl. ....................................................... 704/209
(58) Field of Classification Search .................... 704/209
See application file for complete search history.

(56) References Cited

U.S. PATENT DOCUMENTS

| 4,941,178 | A | 7/1990 | Chuang |
| 6,236,963 | B1 | 5/2001 | Naito et al. |
| 6,836,761 | B1 | 12/2004 | Kawashima et al. |
| 2004/0260552 | A1 | 12/2004 | Navratil et al. |

FOREIGN PATENT DOCUMENTS

| EP | 1507255 | 2/2005 |
| JP | 2002128262 | 5/2002 |
| JP | 2005062866 | 3/2005 |

OTHER PUBLICATIONS

Notification of the Second Office Action from the Chinese Patent Office for corresponding Chinese Application No. 200610115196.4, dated Feb. 1, 2011.

*Primary Examiner* — Susan McFadden
(74) *Attorney, Agent, or Firm* — Wolf, Greenfield & Sacks, P.C.

(57) ABSTRACT

A method for processing speech data includes obtaining a pitch and at least one formant frequency for each of a plurality of first speech data; constructing a first feature space with the obtained fundamental frequencies and formant frequencies as features; and classifying the plurality pieces of first speech data using the first feature space, and thus a plurality of speech data classes and the corresponding description are obtained.

26 Claims, 3 Drawing Sheets

METHOD AND APPARATUS FOR PROCESSING SPEECH DATA WITH CLASSIFICATION MODELS

FIELD OF THE INVENTION

The application relates to method and apparatus for processing speech data, and program product for performing the same.

TECHNICAL BACKGROUND

Automatic speech recognition (ASR) is a technique for recognizing the contents a speaker speaks, and has been developed since years. During recognizing the contents of a speech, the performance of automatic speech recognition (ASR) is still difficult because of the widely varying acoustic environment such as different speakers, speaking styles, background noise and different audio transmission channels. To resolve the problems, there has been much interest in the use of normalization and adaptation techniques to take into account this highly non-homogenous data.

The normalization of speech data includes normalization of transmission channel, microphone normalization, speech speed normalization, speaker normalization and cepstrum normalization. Among these normalizations, the speaker normalization is one of the normalization methods that are often used for removing the heterogeneity in speech data. Speaker normalization mainly comprises normalization of speech spectrum, and the normalization factor is usually referred to as warping factor, which reflects the characteristics of speakers of certain type and is used for normalizing the corresponding speech spectrum. After speaker normalization, the differences among speeches of different speakers due to the acoustic characteristics and speaking styles of speaker may be eliminated, so that the normalized speech is easier to be recognized in terms of the contents thereof.

Therefore, in speech recognition, the stage of speaker normalization may be regarded as a pre-recognition or a pre-processing stage before the speech content recognition stage. That is, before recognition of speech content, the class of the speech data (corresponding to the class of the speaker) is recognized firstly and the speech spectrum is normalized depending on the class of the speaker, then it comes to recognition of contents.

Further, said "pre-recognition" or "pre-processing" stage comprises two sub-stages: recognition of the class of the speaker; and normalization of the speech spectrum in accordance with the recognized class of the speaker. Then the influences of the differences in vocal tract among different speakers on the speech content recognition may be removed. Depending on the application, the number of the classes of speaker may be more or less. As an example having small number of classes, the speakers may be classified into "male" and "female", or "adult", "children" and "aged". More classes are possible, and even each human being may be regarded as one class. That is, as a class, the speaker is first recognized. But the computation load thus occurred will be very heavy.

In usual normalization, each speaker class has corresponding normalization factor(s), that is, warping factor(s). Physically, the warping factor is a factor for compressing or extending the spectrum of a speaker. In linear normalization, each speaker class corresponds to one normalization factor, that is, the speaker spectrum is linearly normalized; while in non-linear normalization, each speaker class may correspond to multiple normalization factors, that is, the speaker spectrum is non-linearly normalized.

Like ordinary recognition, the recognition of speaker class also comprises a training stage and a recognition stage. Different speaker classes and a corresponding classifier are obtained after completion of the training stage. In the recognition stage, the classifier obtained in the training stage classifies the speech samples into respective speaker classes.

Conventionally, for obtaining the warping factor, there are basically two methods: a parametric approach, disclosed, for example, in U.S. Pat. No. 6,236,963(Speaker Normalization Processor Apparatus for Generating Frequency Warping Function, and Speech Recognition Apparatus with Said Speaker Normalization Processor Apparatus); or linear search.

Among the widely used normalization techniques, vocal tract length normalization (VTLN) is one of the most popular methods to reduce inter-speaker variability. VTLN actually is normalization of speaker spectrum. Vocal tract is the channel for producing voices in human body, including lips, oral cavity and the other vocal organs. The positions and shapes of various vocal organs determine the voice to be produced. In other words, the shape of the vocal tract determines the voice to be produced. In broad sense, vocal tract length is one of the shape elements of the vocal tract; but in narrow sense in the field of speech normalization, the vocal tract length is distinguished from vocal tract shape, that is, the vocal tract shape refer to the shape elements other than the vocal tract length.

In conventional parametric approach, unsupervised GMM (Gaussian Mixed Model) classification is adopted. The classification comprises a training stage and a recognition stage. In the training stage, the training samples are classified without supervision, and then the classifier is described with a GMM model. Then, the same warping factor is applied to all the speakers belong to the same class.

Since VTL (vocal tract length), which reflects the different in vocal tract between different speakers, has relationship with formant positions, and hence the formant frequency reflecting the VTL could be calculated based on the linear predictive model. Its disadvantages are that formant frequency and its relationship with VTL are highly dependent on the context (Li Lee, Richard C. Rose, "Speaker Normalization Using Efficient Frequency Warping Procedures," in Proc. ICASSP Vol. 1, pp. 353-356, Atlanta, Ga., May 1996), and could vary largely with different context even for the same speaker. While in the current parametric approach, the pitch fails to be taken into account when selecting features and only formant frequencies are adopted. Moreover, the current parametric approach does not consider the VTL's high dependency on the context, and thus the classification does not consider the context. Anyway, the parametric approach is still adopted widely due to small computation load and stable computation results.

In the line search method, a speaker is classified by maximizing the probability of recognizing an utterance given a particular acoustic model in the content recognition stage. Strictly speaking, the normalization based on the line search factor doesn't not exactly mean it is doing vocal tract length normalization because the classification is conducted in the way to increase the matching score of the acoustic model in the content recognition stage. And thus, what is reflected is not only the difference in the vocal tract length, but a mixed result of various factors. For example, the variation in vocal tract shape could also affect on the line search warping factor.

The major disadvantage of the line search is that it is very expansive in computation, since one needs to carry out the speech decoding process for every possible class and select the one with which the matching score is the best. Otherwise, classification using ML (Maximum Likelihood) to search the best matching score with the acoustic models in the content recognition stage will make the classification very dependent on the acoustic model in the content recognition stage, and the result is very unstable. See Zhan Puming, Waibel Alex "Vocal tract length normalization for large vocabulary continuous speech recognition", CMU-CS-97-148, May 1997.

SUMMARY OF THE INVENTION

Considering above, one object of the invention is to provide an improved method and apparatus for processing speech data, so as to improve the speaker classification with reasonable computation load, so that the recognition rate of speech recognition will be improved.

For realizing the object, the present application proposes a technical solution for solving the problem by using a VTSL (vocal tract shape and length) method based on acoustic characteristics of individual speakers. Specifically, the present application provides an improved method and apparatus for processing speaker speech data, wherein the formant frequencies and pitch, both depending on the vocal tract length and shape of individual speakers, are used as feature parameters in clustering to train the classifier.

In the invention, first, formant frequencies corresponding to the vocal tract length and the pitch corresponding to the vocal tract shape are obtained from the speaker-specific formants, and then the formant frequencies and pitch may be used in classifying the speakers, training speaker classification model for speaker-independent speech recognition. Accordingly, during the recognition stage, the speaker classification model is used to select a particular speaker class. And thus, the speaker class may be mapped onto a warping factor, which is used for normalizing the speech of the speaker.

Specifically, the method for processing speech data according to the invention comprises steps of: obtaining a pitch and at least one formant frequency for each of a plurality of first speech data; constructing a first feature space with the obtained fundamental frequencies and formant frequencies as features; classifying said plurality pieces of first speech data using said first feature space, and thus a plurality of speech data classes and the corresponding classifier are obtained.

The invention also provides an apparatus for processing speech data comprising: pitch extractor for extracting the pitch of a speech data; formant frequency extractor for extracting at least one formant frequency of a speech data; and means for constructing a first feature space with obtained fundamental frequencies and formant frequencies as features, and classifying a plurality of first speech data using said first feature space, and thus obtaining a plurality of speech data classes and the corresponding classifier.

The invention also provides a program product for realizing the above-mentioned method.

According to the invention, a new feature space is defined by selecting features different from those in the conventional speech normalization technique, and the influence of the speaker on the content recognition due to the variability of the vocal tract is described more completely. Consequently, a better balance is achieved between the computation complexity and the accuracy requirements in the speak classification. On one hand the heavy computation load the linear search method would encounter could be avoided; on the other hand a higher accuracy than conventional parametric approach may be realized. The experiment also proves the effect of the invention.

In the invention, supervised classification is conducted during the training and blindfold classification is avoided, that is much better than solution adopting un-supervised classification. In addition, the specific value of the warping factor of each class may be either a priori, or calculated from the classification result.

In one of the preferred embodiments, the context is also considered by introducing prior phonetics knowledge as heuristic information. The speaker classification may be finer by using the phonetics knowledge as heuristic information in classification, and thus the classification may be more accurate and the warping factor may be obtained more accurately.

In a more preferred embodiment, the speech sample is phonetically labeled through Viterbi alignment. By automatically labeling the raining samples through Viterbi alignment, the accuracy in class labeling of the samples to be classified will be improved considerably.

In a further preferred embodiment, said step for constituting the feature space further comprises performing decorrelation with respect to the feature space. Through decorrelating the features, the redundant information is reduced, and, on one hand, the computation load is reduced; on the other hand, the independence of each feature is increased and the recognition accuracy is less likely to be interfered by the redundant information.

BRIEF DESCRIPTION OF THE DRAWINGS

The preferred embodiments of the invention will be described in details with reference to the accompanying drawings, wherein.

DETAILED DESCRIPTION OF THE PREFERRED EMBODIMENTS

From Bingxi Wang, Speech coding, Xidian University Press, China, July, 2002 we know that (as shown in Table 1), for the same consonant, the positions of the corresponding formants vary among the formant frequencies for six vowels of Mandarin as well as among speakers (such as between male speakers and female speakers) in the way that is not always consistent with their VTLs' variations. Considering that the vocal tract length will not vary when the same person utters different vowels and what will vary is just the vocal tract shape (such as degree of lip-rounding and the like), we know that the variation of the formant position and the vocal tract length is not completely consistent among different speakers and among different vowels. That is because different vocal tract shapes produce different responses to the same frequency. Therefore, different vocal tract shapes lead to different frequency warps, and different frequency warps further produce different formant positions. The formant positions of the vocal shape play an important role to determine the speaker group.

TABLE 1

The Distribution of Formant Frequencies F1-F3 for Six Vowels in Mandarin (Hz)

|    |        | i    | u    | ü    | a    | o    | e    |
|----|--------|------|------|------|------|------|------|
| F1 | Male   | 290  | 380  | 290  | 1000 | 530  | 540  |
|    | Female | 320  | 420  | 320  | 1230 | 720  | 750  |
| F2 | Male   | 2360 | 440  | 2160 | 1160 | 670  | 1040 |
|    | Female | 2800 | 650  | 2580 | 1350 | 930  | 1220 |
| F3 | Male   | 3570 | 3660 | 3460 | 3120 | 3310 | 3170 |
|    | Female | 3780 | 3120 | 3700 | 2830 | 2930 | 3030 |

Nevertheless, although the variation of the formant position as discussed above reflects to some extent the vocal tract shape, the formant mainly reflects the vocal tract length. In the conventional parametric approach discussed in the Technical Background, it is the formant frequency which is used and which only (or mainly) reflects the vocal tract length and fails to well reflect the vocal tract shape. The inventors further discover that the pitch may reflect the vocal tract shape very well. Therefore, the basic idea of the invention is to consider both the vocal tract length and shape, that is, both the formant frequency and the pitch, in the parametric approach for recognizing the speaker.

Speech Data Processing Method

Figure 1:
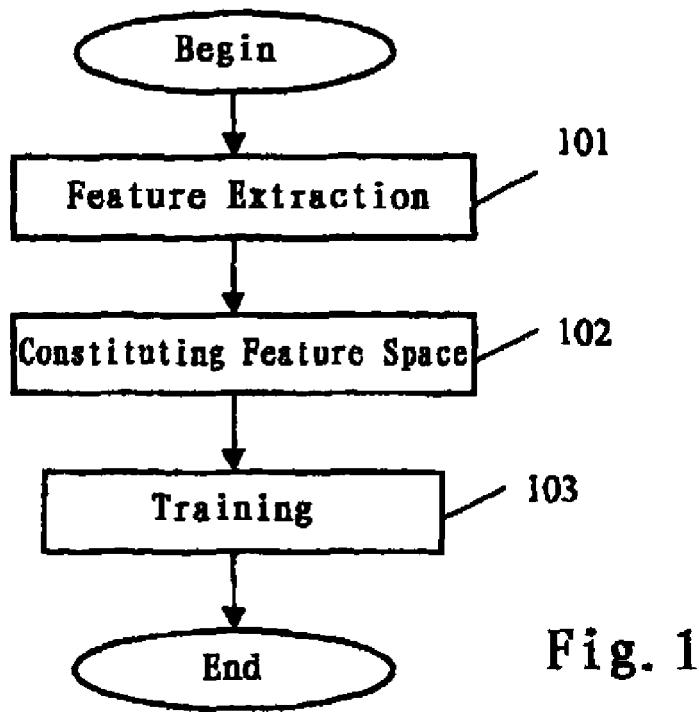
FIG. 1 is a flow chart illustrating the speech data processing method according to one embodiment of the invention.

FIG. 1 shows schematically a method for obtaining a speaker warping factor according to one embodiment of the invention. The method comprising the following steps: feature extracting step 101 for extracting a pitch and at least one formant frequency from each of the training speech samples; feature space constituting step 102 for constituting a feature space using the obtained pitch and formant frequency as features; and training step 103 for, by utilizing said feature space, classifying the training speech samples into a certain number of classes and obtaining corresponding description of the characteristics of the classes, thus obtaining a speaker classifier.

Below we will discuss in details the implementation of the steps. The feature extracting step 101 may be realized with a pitch extractor and a formant frequency extractor. Obviously, in the feature extracting step, extracting the pitch and extracting the formant frequency may be performed in any sequence or simultaneously.

The pitch extractor may adopt any method for estimating pitch. For example, a method similar to the method for estimating pitch as described in the following reference may be adopted: D. Chazan, M. Zibulski, R. Hoory, and G. Cohen, "Efficient Periodicity Extraction Based on Sine-wave Representation and its Application to Pitch Determination of Speech Signals", EUROSPEECH-2001, Sep. 3-7, 2001, Aalborg Denmark. In that reference, the speech signal is modeled as a finite sum of sine-waves, with time-varying amplitudes, phases and frequencies. Assuming the speech signal x(t) can be approximated by a finite sum of sine-waves, let the approximation of x(t) be of the form:

$$x(t) = \sum_{i=1}^{N} a_i \sin(2\pi f_i t + \phi_i) \quad (1)$$

Where $\{a_i, f_i, \phi_i\}_{i=1}^{N}$ are the N sine-wave amplitudes (positive and real), frequencies (in Hz) and phase offsets (in radians), respectively.

Its Fourier transform and utility function are as following:

$$X(f) = \int_{-\infty}^{+\infty} x(t) e^{-j2\pi f t} dt \quad (2)$$

$$U(f) = \int_{0}^{+\infty} c_f(v) |X(v)| dv \quad (3)$$

For each candidate fundament frequency f, the comb function $c_f(v)$ is defined such that it receives its maximum values at the arguments v=f, 2f, 3f, . . . , corresponding to the candidate pitch harmonics.

The frequency F0 which maximizes (3) utility function is selected as the fundamental-frequency (pitch) of the signal x(t);

$$F_0 = \arg\max_{f} \{U(f)\} \quad (4)$$

As mentioned above, the fundamental extracting step and the pitch extractor may adopt any known method or any method developed in the future. For example, any of the following methods may be adopted:

I. AMDF (Average Magnitude Difference Function)

The technique, a variation of autocorrelation analysis, uses a difference signal formed by delaying the input speech various amounts and subtracting the delayed waveform from the original. The difference signal is always zero at delay=ø for a voiced sound having a quasi-periodic structure. Unlike the generation of the autocorrelation function, the AMDF calculations require no multiplications, a desirable property for real-time speech processing.

II. NCCF (Normalized Cross Correlation Function)

The normalized cross correlation function (NCCF) is defined as follows:

Given a frame of speech sampled, s(n), 0≦n≦N−1, Then:

$$NCCF(k) = \frac{\sum_{n=0}^{N-k} s(n)s(n+k)}{\sqrt{e_0 e_k}}$$

Where $$e_k = \sum_{n=k}^{n=k+N-K} S^2(n),$$

$$0 \le k \le K - 1$$

Also, the formant frequency extracting step and the formant frequency extractor 104 may adopt any known method or any method developed in the future.

One of the possible method is formant estimation based on LPC (Linear Prediction Coefficient). The transformation function of LPC is:

$$H(z) = \frac{1}{A(z)} = \frac{1}{1 - \sum_{k=1}^{M} a_k z^{-k}} \quad (5)$$

Where A(z) is the predication polynomial obtained from a speech waveform, and ak is linear prediction coefficient.

If the equation A(z)=0, M/2 pairs of conjugated complex root $(z_i, z^*_i)$ are derived:

$$z_i = r_i e^{j\theta}$$

$$z^*_i = r_i e^{-j\theta} \quad (6)$$

Where $r_i$ is root modulus and $\theta$ is angle.

A number of standard references on speech processing provide the following transformation from complex root (6) and sampling rate $T_s$ to formant frequency F and band width B.

$$F_i = \theta_i / 2\pi T_s$$

$$B_i = |\log r_i| / \pi T_s \tag{7}$$

In the general case, five formant components are enough for formant analysis. Therefore, M is often set to 8~10, that is, 4-5 formant components will be obtained. Obviously, more or less formant components may be used. Nevertheless, at least one formant component should be used for constituting the feature space.

Then a feature space comprised of the pitch F0 and at least one formant frequency (such as F1 to F4) is obtained. The feature space so constituted as to comprise the pitch and at least one formant frequency may be directly used in speaker classification.

In a preferred embodiment, the feature space is decorrelated and thus a quadrature feature space is obtained. As discussed above, although F0 reflects the vocal tract shape very well, the formant positions are also affected by the vocal tract shape to some extent. That is to say, F0 and the formant frequencies are correlated to each other to some extent. Therefore, for eliminating said correlation on one hand, and for reducing the computation load on the other hand, said feature space is decorrelated so that the correlation among features may be eliminated and the number of dimensions of the feature space may be decreased. The decorrelating operation in the feature space constructing step may adopt any decorrelation methods, one example is PCA (principal component analysis). The first several feature values in the result of PCA may be selected to form a basic set as a sub-space. For example, in the embodiment, three feature values may be selected. That is, the 5-dimensional feature space given as an example above may be reduced to be 3-dimensional, thus a 3-dimensional feature set $v_p(t) = Av_f(t)$ may be obtained, where A is the PCA matrix. The other examples of decorrelation method include K-L transformation, singular value decomposition (SVD) and DCT transformation, and etc.

Figure 2:
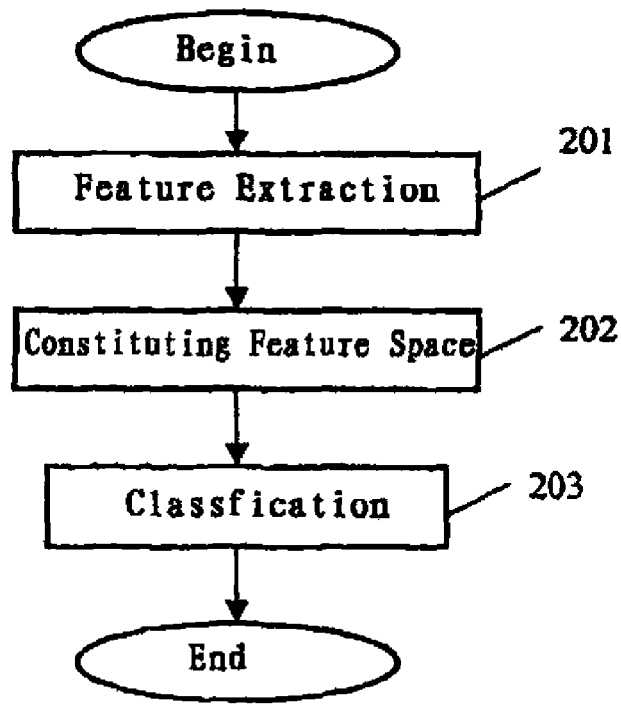
FIG. 2 is a flow chart illustrating the speech data processing method according to another embodiment of the invention.

In the training step 103, the classifier in the prior art parametric approach may also be adopted. According to the prior art parametric approach, first, unsupervised classification is conducted through clustering, with the number of classes appointed by the user according to his/her experience, or determined directly by the clustering algorithm. Then, the classified training samples are described with a GMM model. In addition, the invention also provides a preferred classification method: supervised classification. A typical supervised classification may directly adopt a GMM model, that is, directly describes the classifier using diagonal Gaussian probability density. FIG. 2 schematically shows the supervised classification according to a preferred embodiment.

The supervised classification requires determining a priori the classes of the speech samples. That is, it is necessary to label the classes of the speech samples in advance (not shown). The labeling step may be performed at any time before the training step 103, even before the feature extracting step 101.

For rendering the classification more accurate, the inventors further improves the classification technique. In the conventional parametric approach, blindfold search is conducted without considering the influences of the phonetic units on the vocal tract, that is, the classification is conducted according to "male" or "female" or the like. While as mentioned above, the vocal tract will vary among different vowels for the same person and the same consonant. Therefore, in the invention, prior phonetic knowledge is introduced in to the training of the classifier model for speaker normalization. Specifically, in the invention, different vowels, such as a plurality of or all the vowel phonemes a, o, e, i, u, ü in the Mandarin may be used as classification criteria. For example, the classification may be conducted according to the combination of "male" or "female" and all of the six vowel phonemes, and thus 2×6=12 classes may be obtained, with each class corresponding to respective warping factor (but it will not exclude the case where the warping factors of some classes are the same in value). Alternatively, the speech samples may be classified, according to the combination of "aged", "adult" or "children" and the vowel phonemes, into 3×6=18 classes. Through such definition, classes are formed corresponding to different combinations of different speakers and different vowel phonemes, the accuracy of classification may be improved. After classification based on vowel phonemes, the training speech samples are labeled with their respective classes.

The labeling of speech samples may be performed though Viterbi alignment. Also, the alignment manner is not limited to Viterbi alignment and other alignment methods may be adopted, such as manual alignment, DTW (Dynamic time warp) and etc. The step of labeling the training speech samples with their respective classes reflecting the speaker may be performed at any time before the training step, even before the feature extracting step.

Then, after labeling the classes of the speech samples for training the classifier, supervised training of the classifier may be performed in Step 103. The training may be conducted through expectation-maximization algorithm based on the clustering labels, or though any other algorithm. In the training, the speaker normalization classifier, such as GMM classifier, is trained using the vector set $v_p(t)$. Apparently, the classifier is not limited to GMM classifier, but may be any supervised classifier known by any skilled in the art, such as NN (neuro-network) classifier, SVM (Support Vector Machine) classifier and the like.

Thus, through the steps discussed above, the training of the speaker classifier is completed.

The classification of the speech data using the classifier trained according to the method as discussed above will be described below.

As shown in FIG. 2, the speaker class recognition comprises feature extracting step 201, feature space constituting step 202 and recognition step 203. Here, the feature extracting step 201 and the feature space constituting step 202 in the recognition stage are the same as the feature extracting step 101 and the feature space constituting step 102 in the training stage, except that the object to be processed becomes the speech data to be recognized. Therefore, the detailed description of the feature extracting step 201 and the feature space constituting step, including all the preferred embodiments, is omitted here.

In the recognition step 203, the speech data to be recognized is classified by the classifier obtained in the training stage using the features of the speech data to be recognized in the Steps 201 and 202 into appropriate class, and thus the whole speaker class recognition is completed.

In a preferred embodiment, if the feature space is decorrelated in the training stage, then the feature space in the recognition stage should also be decorrelated correspondingly.

As mentioned above, the training stage and the recognition stage according to the invention belong to the first stage of the speaker normalization. For understanding the invention better, the spectrum normalization stage will be described below.

In general, spectrum normalization aims to eliminate the characteristics difference among speaker classes using the characteristics of different speaker classes, and may be achieved in many ways. One remarkable difference among different speaker classes is the variation of spectrum width. Therefore, the spectrum width should be made consistent before the content recognition for recognize the speech content accurately. Consequently, at the present, the main means for normalizing the speaker classes are extension or compression of the speech spectrum.

In such a situation, the warping factor is the extension ratio or the compression ratio.

When the class is determined, the warping factor may be obtained by various means. For example, the warping factor may be an empiric value, which may be obtained statistically. For the present invention, the warping factor may be obtained externally, or a priori. After speaker classification according to the invention, the normalization stage may directly utilize the warping factor corresponding to the speaker class.

In a preferred embodiment of the invention, a step may be added after the training step for obtaining the spectrum normalization factor (not shown), that is, for giving respective spectrum normalization factor for each speaker. Correspondingly, in the recognition stage, once the speech data is classified into a certain class, the warping factor that should be used is also determined.

Generally, the value of the warping factor ranges from 0.8 to 1.2. When determining the warping factors of respective classes, linear or non-linear method may be adopted.

The linear method consists of equi-partitioning the value range 0.8-1.2. For example, in the GMM model, the probability density function is calculated for the speech samples, and each class corresponds to a range of the probability density function. In general, the probability density function ranges from 0 to 1. The ranges of the probability density functions of all the classes are sorted according to the value range, the value range 0.8-1.2 is also equi-partitioned correspondingly and mapped on to the sorted ranges of the probability density functions, and thus the warping factors of respective classes may be obtained. Taking 12 classes as an example, in the ascending order of the ranges of the probability density functions of respective classes, the warping factors are respectively: 0.8, 0.8+(1.2−0.8)/12, 0.8+2*(1.2−0.8)/12, . . . , 0.8+11*(1.2−0.8)/12.

In the non-linear method, the value range of the warping factor is not divided equidistantly, so that the warping factor is more accurate for respective classes. Among the non-linear mapping methods, there is a probability function method adopting grid searching. That is, setting 13 grids in the value range (0.8-1.2) of the warping factor α, then try each warping factor α to get its degree of matching with the acoustic model HMM, take the warping factor having the highest matching degree as the warping factor α of the current speaker class. Specifically, the following mapping function may be defined:

$$\hat{\alpha}_i = \underset{\alpha}{\operatorname{argmax}} Pr(X_i^\alpha \mid \lambda, W_i)$$

Where λ is HMM acoustic model, $W_i$ is the script of the corresponding speech, $X_i^\alpha$ is the speech obtained by normalizing the speech sample of the speaker of Class I using the warping factor α. The unction Pr( ) is for calculating the matching degree (value of likelihood function) with the HMM acoustic model λ.

Figure 4:
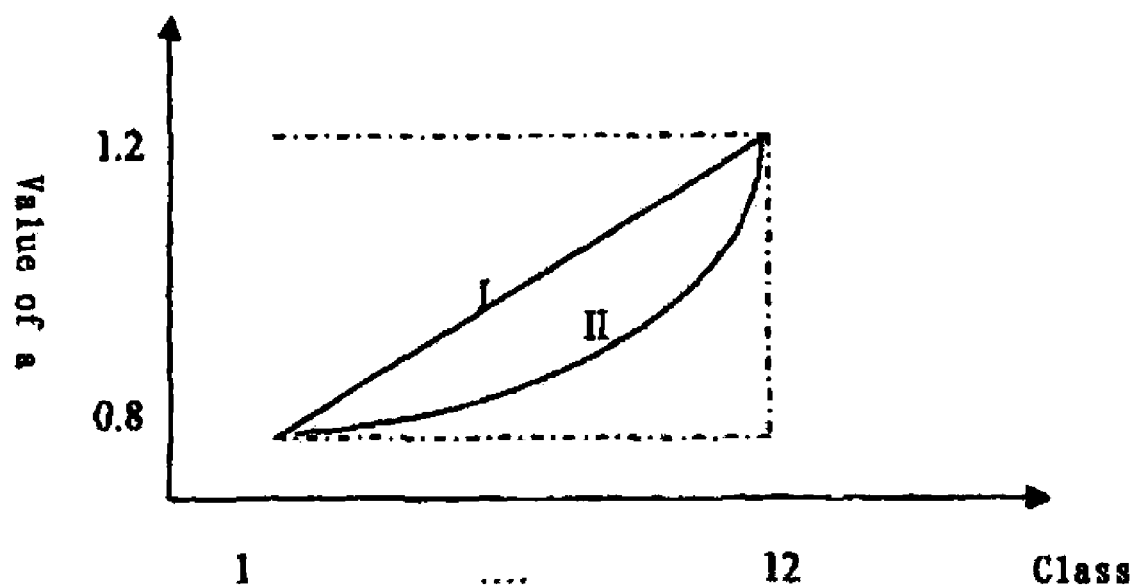
FIG. 4 is a graph illustrating how to obtain a warping factor.

Of course we may also define a quadratic function or high-order function as shown in FIG. 4. In the drawing, I is linear mapping and II is quadratic mapping. The specific parameters of the quadratic function may be determined according to the specific form of the line II.

Thus we could see that by use of the solution of the invention, both the pitch and the formant frequency may be used to train the speaker classifier better, and thus obtain classes reflect better the characteristics of the vocal tract (including length and shape). Consequently, the speech spectrum may be normalized more accurately and content recognition rate may be improved.

In practice, generally the first utterance is used to detect the speaker cluster for the coming task session. During one session, the speaker often doesn't change and share the same warping factor. However, the normalization of the speech sample using the warping factor obtained according to the invention, and content recognition based on the normalized speech sample, are not within the scope of the invention.

In the preferred embodiments as discussed above, different warping factors may be obtained with respect to different vowels. If the computing power of the speech recognition equipment so permits, the normalization may be carried out with respect to each vowel. But generally, after obtaining a plurality of warping factors though clustering according to the invention, a single warping factor may be obtained by synthesizing these warping factors, for normalizing the speaker class.

The following is an example of speech spectrum normalization and recognition applying the method according to the invention.

Let x(t) be the input speech signal, $O_\alpha(n)$ is the n-th filter bank output after normalization, and α is the obtained warping factor dependent on speaker, then $$O_\alpha(n) = \sum_{w=l_n}^{w=h_n} T_n(w) X(\varphi_\alpha(w)) \qquad (9)$$

Where $\phi_\alpha(w)$ is the warping function. $O_\alpha(n)$ depends on the speaker-specific warping factor and warping rules. Tn(W) is the output of the n-th filter, hn, ln are respectively the upper frequency limit and bottom frequency limit of the n-th filter, and X is the speech signal.

For solving the problem of band width mismatch between the normalized speech sample and the classification model for content recognition, a piecewise warping rule may be used for ensuring the band width of the normalized spectrum matches the classification model.

$$\varphi_\alpha(w) = \begin{cases} \alpha^{-1}w & \text{if } w < w_0 \\ bw + c & \text{if } w \geq w_0 \end{cases} \qquad (10)$$

Where w0 in equation (10) is a fixed frequency which is set with experiment, and b, c can be calculated from w0. According to equation (10), α>1.0 means to compress the spectrum, and α<1.0 equals with to stretching the spectrum, and α=1.0 corresponds to no warping case.

The above is an example of linear normalization. As mentioned above, the normalization may be either linear or bi-linear or non-linear.

Bi-linear normalization:

$$\varphi_\alpha(w) = w + 2\tan^{-1}\left(\frac{(1-\alpha)\sin(w)}{1-(1-\alpha)\cos(w)}\right)$$

Where $\phi_\alpha(w)$ is normalization function, and $\alpha$ is warping factor.

Non-linear normalization:

$$\varphi_\alpha(w) = \alpha^{\frac{3w}{2w_0}}$$

Where $\phi_\alpha(w)$ is normalization function, and $\alpha$ is warping factor. w0 is a fixed frequency which is set through experiment.

In terms of the invention, the bi-linear and non-linear normalizations are different from the linear normalization in that the warping factor is different. Such difference just belongs to the regular means in the field and detailed description thereof is omitted here.

Speech Data Processing Apparatus

Figure 3:
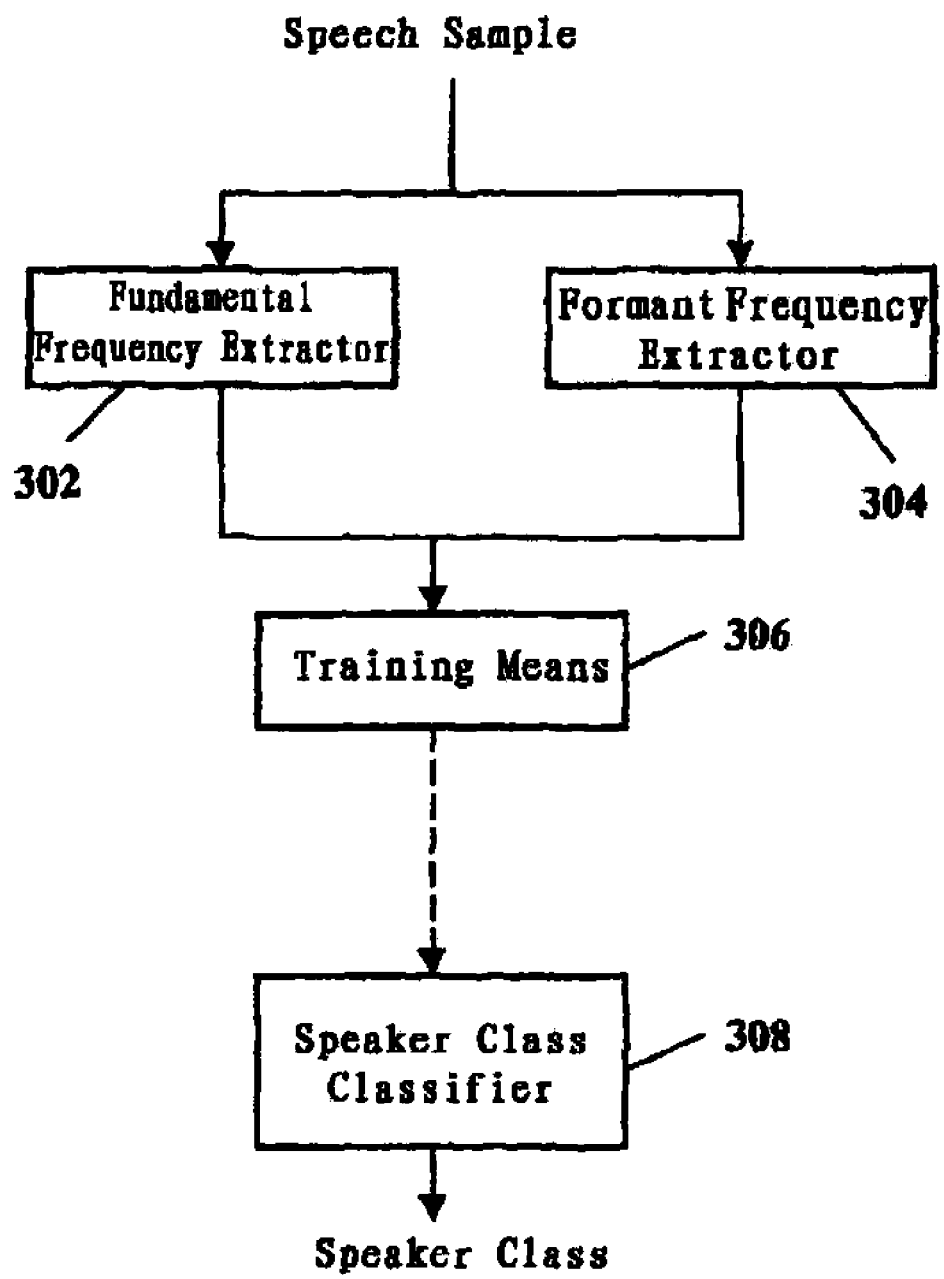
FIG. 3 is a schematic diagram illustrating the speech data processing apparatus according to one embodiment of the invention.

FIG. 3 schematically shows the speech data processing apparatus according to one embodiment of the invention. The apparatus comprises pitch extractor 302 for extracting the pitch of a training speech sample; formant frequency extractor 304 for extracting at least one formant frequency of the training speech sample; and training means 306. The training means 306 classifies the training speech samples into a predetermined number of classes using the feature space comprised of said pitch and said at least one formant frequency, and obtains corresponding characteristics description, and thus obtain speaker class classifier 308.

The fundamental extractor 302 and the formant frequency extractor 304 have been described above and description will not be repeated here.

The training stage performed by the training means 306 has also been described above.

In a preferred embodiment, before the training means 306 may be inserted means for decorrelating the feature space comprised of the pitch extracted by the pitch extractor 302 and the formant frequency extracted by the formant frequency extractor 304, and thus decreasing the number of dimensions and obtaining a quadrature feature space. The decorrelation also has been described above.

As mentioned above, the training means 306 may conduct either unsupervised classification or supervised classification. When conducting supervised classification, the speech data processing apparatus further comprises means for labeling a priori the class of the training speech sample. The labeling means may adopt Viterbi alignment to conduct labeling. Also, as mentioned above, any possible alignment method may be used.

Also, for conducting more accurate classification with the context taken into account, the means for labeling a priori the class of the training speech sample may be further configured to label a priori the speech sample with phonetic knowledge, such as label a priori the phonemes, and thus the classes may synthetically reflect both the speaker and said phonetic knowledge.

Also, as a preferred embodiment, means for giving a spectrum normalization factor corresponding to each speaker class may be incorporated into the speech data processing apparatus according to the invention. The specific implementation has been described before.

In a preferred embodiment, the speech data processing apparatus further comprises a speaker class classifier trained by said training means 306. The speaker class classifier 308 compares the features extracted from the speech data to be recognized by the pitch extractor 302 and the formant frequency extractor 304 with the features of respective classes in the classifier, and thus classifies the speech data to be recognized into an appropriate class. Then, the spectrum normalization factor associated with the class may be used to normalize the spectrum of the speech data to be recognized, so as to facilitate the content recognition of the speech data. For the other aspects of the speech data processing apparatus, reference may be made to the description above about the speech data processing method.

To evaluate the effect of the invention, we perform a series of experiments on the speaker independent Mandarin speech recognition. The acoustic model is trained from all of the acoustic training data provided by internal recording database for automatic speech recognition (ASR) system of IBM Corporation. The testing data is recorded in a stable office condition. 120 speakers (60 males and 60 females) are recorded with no restriction on their speaking style for three tasks. There are 15 utterances for each speaker.

The main features of our ASR system are summarized as follows: 40-dimentianl acoustic features that result from 13-dimensional MFCCs (Mel Frequency Cepstrum Coefficients) followed by the application of temporal LDA and MLLT, and it consists of about 3 k HMM states and 33 k Gaussian mixtures. The search engine is based on A* heuristic stack decode.

To show the efficiency of the proposed algorithm to eliminate speakers' variation, experiments of three tasks are performed. The first two are isolate-word mode, while the third is continuous digits recognition (the length from 3 to 8), representing different applications:

1. People Name
2. Stock Name
3. Digits

Through the experiments four methods are compared with each other: baseline system (without speaker spectrum normalization), conventional parametric approach, linear searching method and the VTLS method of the invention. Through these methods, different speaker spectrum normalization methods are applied to the same application, then speech content recognition is conducted with the same speech content recognition method. The different speaker speech normalization methods are evaluated by comparing respective error rates of the speech content recognition.

TABLE 2

Word error rate for three tasks with the VTSL

| Task | | % WER |
|---|---|---|
| People Name | Base-line | 5.72 |
| | Parametric method | 5.52 |
| | Linear search | 5.33 |
| | VTLS | 4.86 |
| Stock Name | Base-line | 1.94 |
| | Parametric method | 1.91 |
| | Linear search | 1.85 |
| | VTLS | 1.78 |
| Digits | Base-line | 3.32 |
| | Parametric method | 3.21 |
| | Linear search | 3.16 |
| | VTLS | 3.11 |

Table 2 shows the recognition word error rate on three tasks. The warping rule is based on Piecewise mode of equation (10). By using VTSL for people name, stock name, and digits, the average relate word error rates are reduced to 11.20%, 8.45, 5.81%, comparison with the base-line system (that is, without speaker normalization), parametric method and linear search.

Apparently, the speech data processing method and apparatus improves the recognition rate remarkably.

While the invention has been described with reference to specific embodiments disclosed herein, it is not confined to the details set forth herein and there are may alternatives to the components and steps as described, and the protection scope is intended to cover all the variations or equivalents that are obvious to a person skilled in the art having read the specification.

What is claimed is:

1. A method for processing speech data, the method comprising:
    obtaining a fundamental frequency and at least one formant frequency for each of a plurality of pieces of first speech data;
    constructing a first feature space with the obtained fundamental frequencies and formant frequencies as features; and
    using a processor, training a classification model corresponding to a plurality of speech data classes, by classifying said plurality of pieces of first speech data using said first feature space.

2. The method for processing speech data according to claim 1, further comprising:
    associating each of the plurality of speech data classes with a corresponding spectrum normalization factor.

3. The method for processing speech data according to claim 2, wherein associating each of the plurality of speech data classes with a corresponding spectrum normalization factor comprises:
    linearly mapping said plurality of speech data classes onto a spectrum normalization factor value range.

4. The method for processing speech data according to claim 2, wherein the step of associating each of the plurality of speech data classes with a corresponding spectrum normalization factor comprises:
    non-linearly mapping said plurality of speech data classes onto a spectrum normalization factor value range.

5. The method for processing speech data according to claim 1, wherein the classifying is performed using a supervised classification method.

6. The method for processing speech data according to claim 5, further comprising labeling said plurality of pieces of first speech data according to said plurality of speech data classes before training the classification model.

7. The method for processing speech data according to claim 6, wherein the labeling is performed using a Viterbi alignment method.

8. The method for processing speech data according to claim 6, wherein labeling the plurality of pieces of first speech data comprises further labeling a priori speech samples of the plurality of pieces of first speech data with phonetic knowledge.

9. The method for processing speech data according to claim 8, wherein labeling a priori the speech samples with phonetic knowledge comprises labeling a priori a plurality of vowel phonemes.

10. The method for processing speech data according to claim 1, wherein constructing the first feature space further comprises performing decorrelation with respect to the first feature space, so as to reduce dimensions of the first feature space.

11. The method for processing speech data according to claim 1, further comprising:
    obtaining a fundamental frequency and at least one formant frequency for second speech data;
    constructing a second feature space with the fundamental frequency and at least one formant frequency obtained for the second speech data as features; and
    classifying said second speech data using said second feature space and using the classification model trained from said first speech data, thereby determining a speech data class of said second speech data.

12. The method for processing speech data according to claim 11, further comprising, normalizing the second speech data using a corresponding spectrum normalization factor associated with the determined speech data class.

13. The method for processing speech data according to claim 1, wherein the processor operates in an automatic speech recognition system.

14. A non-transitory computer-readable storage medium encoded with computer-executable instructions that, when executed, perform the method for processing speech data according to claim 1.

15. An apparatus for processing speech data, the apparatus comprising:
    a computer system programmed to:
        extract a fundamental frequency from each of a plurality of pieces of first speech data;
        extract at least one formant frequency from each of the plurality of pieces of first speech data;
        construct a first feature space with the extracted fundamental frequencies and formant frequencies as features; and
        train a classification model corresponding to a plurality of speech data classes, by classifying the plurality of pieces of first speech data using said first feature space.

16. The apparatus for processing speech data according to claim 15, wherein the computer system is further programmed to associate each of the plurality of speech data classes with a corresponding spectrum normalization factor.

17. The apparatus for processing speech data according to claim 16, wherein the computer system is programmed to associate each of the plurality of speech data classes with a corresponding spectrum normalization factor by linearly mapping said plurality of speech data classes onto a spectrum normalization factor value range.

18. The apparatus for processing speech data according to claim 16, wherein the computer system is programmed to associate each of the plurality of speech data classes with a corresponding spectrum normalization factor by non-linearly mapping said plurality of speech data classes onto a spectrum normalization factor value range.

19. The apparatus for processing speech data according to claim 15, wherein the computer system is programmed to classify the plurality of pieces of first speech data using a supervised classification method.

20. The apparatus for processing speech data according to claim 19, wherein the computer system is further programmed to label said plurality of pieces of first speech data according to the plurality of speech data classes before training the classification model.

21. The apparatus for processing speech data according to claim 20, wherein the computer system is programmed to label said plurality of pieces of first speech data using Viterbi alignment.

22. The apparatus for processing speech data according to claim 15, wherein the computer system is programmed to construct the first feature space by performing decorrelation with respect to the first feature space, so as to reduce dimensions of the first feature space.

23. The apparatus for processing speech data according to claim 15, wherein the computer system is further programmed to:
   extract fundamental frequency from second speech data;
   extract at least one formant frequency from said second speech data;
   construct a second feature space with the fundamental frequency and at least one formant frequency extracted from the second speech data as features; and
   classify the second speech data using said second feature space and the classification model trained from the first speech data, thereby determining a speech data class of the second speech data.

24. The apparatus for processing speech data according to claim 23, wherein the computer system is further programmed to normalize the second speech data using a corresponding spectrum normalization factor associated with the determined speech data class.

25. The apparatus for processing speech data according to claim 20, wherein the computer system is further programmed to label a priori speech samples of the plurality of pieces of first speech data with phonetic knowledge.

26. The apparatus for processing speech data according to claim 25, wherein the computer system is programmed to label a priori the speech samples by labeling a priori a plurality of vowel phonemes.

* * * * *

UNITED STATES PATENT AND TRADEMARK OFFICE
CERTIFICATE OF CORRECTION

| | | Page 1 of 1 |
|---|---|---|
| PATENT NO. | : 7,957,959 B2 | |
| APPLICATION NO. | : 11/780607 | |
| DATED | : June 7, 2011 | |
| INVENTOR(S) | : Han et al. | |

It is certified that error appears in the above-identified patent and that said Letters Patent is hereby corrected as shown below:

At column 13, claim 4, line 39, please delete "the step of";

At column 14, claim 12, line 13, please change "comprising," to -- comprising --.

Signed and Sealed this
Ninth Day of August, 2011

David J. Kappos
*Director of the United States Patent and Trademark Office*